June 21, 1949.    H. KLEMPERER    2,473,799
CONDENSER WELDING SYSTEM
Filed Jan. 16, 1947
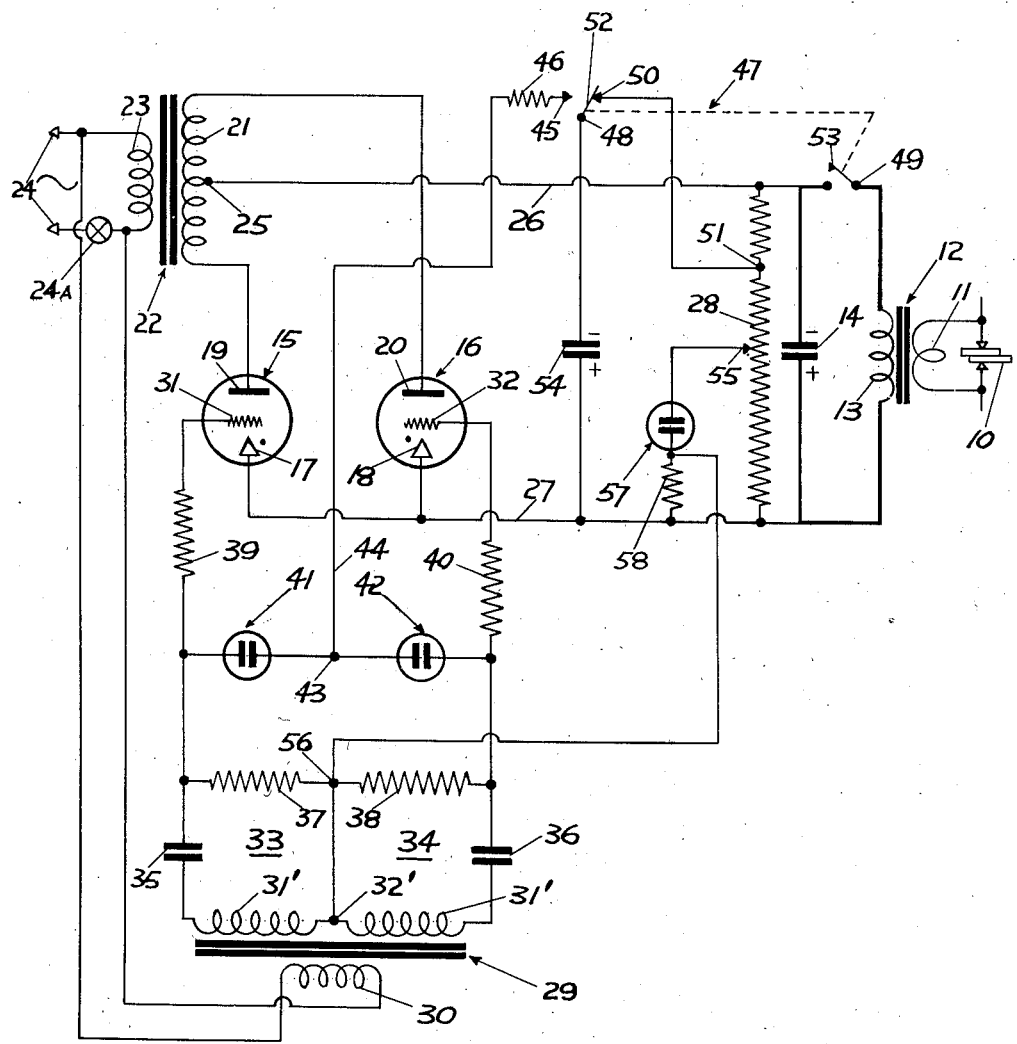
INVENTOR
HANS KLEMPERER
BY Elmer J. Gorn
ATTORNEY Patented June 21, 1949

2,473,799

UNITED STATES PATENT OFFICE 2,473,799

CONDENSER WELDING SYSTEM

Hans Klemperer, Belmont, Mass., assignor to Raytheon Manufacturing Company, Newton, Mass., a corporation of Delaware Application January 16, 1947, Serial No. 722,353

4 Claims. (Cl. 219—4)

This invention relates to condenser welding systems, and more particularly to such systems in which electrical energy is stored in a capacitor and then discharged into a resistance welding load by a substantially unidirectional pulse of current.

The main object of this invention is to provide a simplified system for electrically isolating the capacitor charging circuit from the resistance welding load during the discharging operation of the above described system.

The foregoing and other objects of this invention will be best understood from the following description of an exemplification thereof, reference being had to the accompanying drawing, wherein:

The single figure is a schematic diagram of a condenser welding system embodying the present invention.

In the illustrated embodiment, welding current is supplied to a resistance welding load 10 from the secondary winding 11 of a welding transformer 12, whose primary winding 13 is adapted to be supplied with a pulse of welding current from an electrical energy storage device, for example, a capacitor 14.

The capacitor 14 is adapted to be charged with direct current of a suitable voltage from, in this particular embodiment, a pair of rectifying tubes 15 and 16, preferably of the gaseous discharge type, known to the art as thyratrons. The cathodes 17 and 18 of said thyratrons may be of the continuously energized type. The thyratrons 15—16 are provided, respectively, with anodes 19 and 20 connected to the opposite ends of the secondary winding 21 of a transformer 22, the primary winding 23 thereof being connected to a source of alternating voltage 24. A switch 24A controls the flow of current from said supply source 24. Preferably, the transformer 22 should be a step-up type capable of producing across the secondary winding 21 thereof a high voltage, for example, of the order of 4000 volts, and having a center-tap connection 25, whereby the voltage between either end of said secondary winding and the center tap will be substantially of the order of 2000 volts. The center-tap 25 is connected via a conductor 26 to the negative side of the capacitor 14, while the cathodes 17—18 are connected by a conductor 27 to the positive side of said capacitor. Connected between the conductors 26 and 27 and parallel to the capacitor 14 is a resistance 28 which functions as a voltage divider in a manner to be described hereinafter.

A transformer 29, the primary winding 30 of which is connected in parallel to the primary winding 23 of the high voltage transformer 22, is utilized to supply a source of alternating voltage to the grids 31 and 32 of the thyratrons 15—16. The transformer 29 is preferably a step-down type, the secondary winding 31' thereof being center-tapped at 32' to provide grid control voltages of the order of, for example, thirty volts between said center tap 32' and either end of the secondary winding 31'.

The grid control voltage so derived is fed, via a pair of phase-shifting networks 33 and 34, consisting of capacitors 35—36 and resistors 37—38, and thence through a pair of current-limiting resistors 39—40, to the respective grids 31—32 of the thyratrons. The phase-shifting network provides the necessary means for controlling the average current which is to be stored in the capacitor 14, as claimed and described in the copending application of Hans Klemperer, Serial No. 609,058, filed August 6, 1945, now Patent No. 2,464,238, dated March 15, 1949.

Disposed intermediate the current limiting resistors 39—40 is a pair of glow tubes 41—42. The junction 43 of said glow tubes is connected, via a conductor 44, to a contact 45 via a resistor 46. Said contact 45 is part of a tandem-operated switch 47 consisting of a single-pole double-throw switch 48 and a single-pole single-throw switch 49. The second contact 50 of the switch 48 is connected to a point 51 of the voltage dividing resistor 28. The particular position of said contact point 51 will be explained in connection with the description of the operation of the present invention. The contact arms 52—53, of the respective switches 48 and 49, are in the capacitor 14 charging position as indicated on the drawing. In this position a second capacitor 54 is charged at the time said first-named capacitor receives its charge. The capacitor 54 is connected from its negative terminal to the contact arm 52 and charged to a voltage, represented by the drop across the resistor 28 between the junction of said resistor and conductor 27 and the point 51, that is less than the voltage across the capacitor 14.

The amount of potential that will be impressed across the capacitor 14 is determined by the position of a movable contact 55 on the resistor 28. Intermediate this movable contact and the junction 56 of the phase-shifting network is a third glow tube 57 in series with a current-limiting resistor 58.

Upon closing the switch 24A in the alternating voltage supply lines 24, the thyratrons become conductive, current flows into the capacitor 14 and as said capacitor becomes charged the voltage drop across resistor 28 starts to increase. Assume that the desired voltage across the capacitor 14 is of the order of 1900 volts. Therefore, since the total drop across the resistor 28 will be 2000 volts when the capacitor 14 is fully charged and it is only desired to have 1900 volts thereacross, the voltage drop across that portion of the resistor 28 between the contact 55 and the conductor 27 will be of the order of 100 volts. It will be assumed that this voltage is sufficient to cause the glow tube 57 to break down and conduct current therethrough. When this occurs a negative voltage will be impressed on the grids 31—32 sufficient to substantially block conduction of said thyratrons, since contact 55 is at a negative potential with respect to the cathodes 17—18. Thus when the desired potential across the capacitor is reached, as determined by the setting of the contact arm 55, the charging current to the capacitor 14 is discontinued. At this time the capacitor 54 also becomes charged and its potential is determined by the position of point 51 on the resistance 28 with respect to the positive side thereof.

Now, upon manipulation of the tandem switch 47, the switch 49 through its contact arm 53 closes the circuit consisting of the capacitor 14 and primary winding 13 of the welding transformer 12 and discharges said capacitor to induce in the secondary winding 11 a welding current which in turn is conducted to the welding load 10. The manipulation of the switch 47, simultaneous with the closing of switch 49, moves the contact arm 52 of the switch 48 to contact 45 and starts to discharge the capacitor 54, whose potential is sufficiently high to break down the glow tubes 41—42 and the current flowing therethrough impresses, simultaneously, a negative potential on the grids 31—32 and further maintains said thyratrons in a non-conductive state. The combined value of the resistor 46 and capacitor 54 determine the hold-off time during which the tubes 15 and 16 are maintained in a non-conducting state and is usually determined by the welding cycle.

Manipulation of the tandem switch 47 back to its normal or charging position disconnects the circuit between the capacitor 54 and the glow tubes 41—42 causing said glow tubes to become extinguished and restoring the thyratrons 15—16 to a conducting state.

From the foregoing it will be observed that the present invention provides an economical and simple system for electrically isolating the charging circuit, to wit, the output of the thyratrons 15—16, from the welding circuit consisting of the capacitor 14 and the welding transformer 12, during the welding operation period, and in addition, the use of the system herein described does not in any manner interfere with the voltage regulation of the charging circuit.

The embodiment of this invention which has been illustrated and described has been selected for the purpose of setting forth the principles involved. It will be obvious, however, that the invention may be modified to meet various conditions which may be met in different specific uses, and it is, therefore, intended to cover by the appended claims all such modifications which fall within the spirit and scope of this invention.

What is claimed is:

1. An electrical system comprising: a plurality of capacitors; means for charging said capacitors, said means including a source of alternating voltage and a plurality of grid-controlled gaseous discharge devices for rectifying the same; a load circuit; means for discharging a first of said capacitors through said load circuit; means, operable simultaneously with said discharging means, for discharging a second of said capacitors; and means, including in part said last-named means, for connecting said second capacitor to the grids of said devices during discharge of such capacitor, whereby the voltage across said second capacitor is applied to said grids during the discharge thereof, and thereby the discharge devices are rendered non-conducting.

2. An electrical system comprising: a plurality of capacitors; means for charging said capacitors, said means including a source of alternating voltage and a plurality of grid-controlled gaseous discharge devices for rectifying the same; a load circuit; means for discharging a first of said capacitors through said load circuit; means, operable simultaneously with said discharging means, for discharging a second of said capacitors; and means, including in part said last-named means, for impressing the voltage across said second capacitor during discharge on the grids of said devices, whereby said last-named voltage causes said devices to become non-conducting to thereby electrically isolate said charging means from said load circuit.

3. An electrical system comprising: a plurality of capacitors; means for charging said capacitors, said means including a source of alternating voltage and a plurality of grid-controlled gaseous discharge devices for rectifying the same; a load circuit; switching means, disposed intermediate a first of said capacitors and said load circuit, for discharging said capacitor through said load circuit; a second switching means, disposed intermediate a second of said capacitors and a discharge circuit, and being simultaneously operable with said first-named switching means, for connecting said second capacitor to said discharge circuit to discharge the same; and means, including in part said second switching means, for impressing the voltage across said second capacitor during discharge on the grids of said devices for rendering said devices non-conductive, whereby said non-conducting condition serves to electrically isolate said charging means from said load circuit.

4. A welding circuit comprising: a plurality of capacitors; means for charging said capacitors, said means including a source of alternating voltage and a plurality of grid-controlled gaseous discharge devices for rectifying the same; a welding load circuit; means for discharging a first of said capacitors through said load circuit; means, operable simultaneously with said discharging means, for discharging a second of said capacitors; and means, including in part said last-named means, for applying the voltage across said second capacitor during discharge as a bias voltage to the grids of said devices, whereby said last-named voltage causes said devices to become non-conducting to thereby electrically isolate said charging means from said load circuit.

HANS KLEMPERER.

REFERENCES CITED

The following references are of record in the file of this patent:

UNITED STATES PATENTS

| Number | Name | Date |
| --- | --- | --- |
| 2,383,492 | Klemperer | Aug. 28, 1945 |
| 2,404,971 | Mahoney | July 30, 1946 |